US012592097B2

(12) United States Patent

Hu et al.

(10) Patent No.: US 12,592,097 B2

(45) Date of Patent: Mar. 31, 2026

(54) REAL-TIME, FINE-RESOLUTION HUMAN INTRA-GAIT PATTERN RECOGNITION BASED ON DEEP LEARNING MODELS

(71) Applicant: The Board of Trustees of The University of Alabama, Tuscaloosa, AL (US)

(72) Inventors: Fei Hu, Tuscaloosa, AL (US); Yu Gan, Tuscaloosa, AL (US); Shengting Cao, Northport, AL (US); Xuefeng Wang, Tuscaloosa, AL (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 844 days.

(21) Appl. No.: 17/749,754

(22) Filed: May 20, 2022

(65) Prior Publication Data

US 2023/0040650 A1 Feb. 9, 2023

Related U.S. Application Data

(60) Provisional application No. 63/224,143, filed on Jul. 21, 2021.

(51) Int. Cl.
| | |
|---|---|
| *G06V 40/20* | (2022.01) |
| *G06N 3/08* | (2023.01) |
| *G06N 20/20* | (2019.01) |
| *G06V 10/764* | (2022.01) |

(52) U.S. Cl.
CPC .............. *G06V 40/25* (2022.01); *G06N 3/08* (2013.01); *G06N 20/20* (2019.01); *G06V 10/764* (2022.01)

(58) Field of Classification Search
CPC ...... G06V 40/25; G06V 10/764; G06V 10/82; G06N 3/08; G06N 20/20; G06N 3/0442; G06N 3/0455; G06N 3/0464; G06N 3/0895; G06N 5/01; G06N 20/10; A61B 2505/09; A61B 5/0077; A61B 5/1116; A61B 5/112; A61B 5/1128; A61B 5/4528; A61B 5/7267
See application file for complete search history.

(56) References Cited

U.S. PATENT DOCUMENTS

| | | | | |
|---|---|---|---|---|
| 2021/0275107 A1* | 9/2021 | Pitters | .......................... | G06N 3/08 |
| 2021/0346761 A1* | 11/2021 | Sterling | ................. | G06N 20/00 |
| 2023/0337636 A1* | 10/2023 | Shmigelsky | ......... | G06V 30/147 |

FOREIGN PATENT DOCUMENTS

| | | | | | |
|---|---|---|---|---|---|
| EP | 4147637 A1 | * | 3/2023 | ........... | A61B 5/7264 |
| KR | 20220144186 A | * | 10/2022 | ............. | G06F 21/32 |
| WO | WO-2022030179 A1 | * | 2/2022 | | |

OTHER PUBLICATIONS

Dwibedi et al., "Temporal Cycle-Consistency Learning", Apr. 16, 2019, arXiv:1904.07846v1 [cs.CV] (Year: 2019).*

(Continued)

*Primary Examiner* — Chan S Park
*Assistant Examiner* — Daniel C Chang
(74) *Attorney, Agent, or Firm* — Meunier Carlin & Curfman LLC

(57) ABSTRACT

Described herein are methods, systems and computer-program products for intra- and inter-gait classification for both symmetric and asymmetric gait patterns using images.

4 Claims, 15 Drawing Sheets

(56) References Cited

OTHER PUBLICATIONS

J. M. Jasiewicz et al., "Gait event detection using linear acceler-
ometers or angular velocity transducers in able-bodied and spinal-
cord injured individuals," Gait Posture, vol. 24, No. 4, pp. 502-509,
2006, doi: 10.1016/j.gaitpost.2005.12.017.

Giorgi, Giacomo, et al., Try Walking in My Shoes, if You Can:
Accurate Gait Recognition Through Deep Learning, vol. 10489
LNCS. 2017.

P. Catalfamo, D. Moser, S. Ghoussayni, and D. Ewins, "Detection
of gait events using an F-Scan in-shoe pressure measurement
system," Gait Posture, vol. 28, No. 3, pp. 420-426, 2008, doi:
10.1016/j.gaitpost.2008.01.019.

C. Schreiber and F. Moissenet, "A multimodal dataset of human gait
at different walking speeds established on injury-free adult partici-
pants," Sci. Data, vol. 6, No. 1, pp. 1-7, 2019, doi: 10.1038/s41597-
019-0124-4.

M. Li, S. Tian, L. Sun, and X. Chen, "Gait analysis for post-stroke
hemiparetic patient by multi-features fusion method," Sensors (Swit-
zerland), vol. 19, No. 7, 2019, 1737. doi: 10.3390/s19071737.

C. Morbidoni, A. Cucchiarelli, S. Fioretti, and F. Di Nardo, "A deep
learning approach to EMG-based classification of gait phases during
level ground walking," Electron., vol. 8, No. 8, 2019, doi: 10.3390/
electronics8080894.

R. Ma and F. Hu, "An Intelligent Thermal Sensing System for
Automatic, Quantitative Assessment of Motion Training in Lower-
Limb Rehabilitation," IEEE Trans. Syst. Man, Cybern. Syst., vol.
48, No. 5, pp. 661-669, 2018, doi: 10.1109/TSMC.2016.2636660.

M. Ye, C. Yang, V. Stankovic, L. Stankovic, and S. Cheng, "Gait
Phase Classification for In-Home Gait Assessment Department of
Electronic and Electrical Engineering, University of Strathclyde ,
Glasgow , UK Department of Computer Science and Technology ,
Tongji University , Shanghai , China," vol. 1, No. July, pp. 1524-
1529, 2017.

J. Von Zitzewitz, M. Bernhardt, and R. Riener, "Treadmill Speed
Adaptation," Rehabilitation, vol. 15, No. 3, pp. 401-409, 2007.

J. Kim, H. S. Park, and D. L. Damiano, "An interactive treadmill
under a novel control scheme for simulating overground walking by
reducing anomalous force," IEEE/ASME Trans. Mechatronics, vol.
20, No. 3, pp. 1491-1496, 2015, doi: 10.1109/TMECH.2014.
2341039.

A. Manurung, J. Yoon, and H. S. Park, "Speed adaptation control of
a small-sized treadmill with state feedback controller," 2010 3rd
IEEE RAS EMBS Int. Conf. Biomed. Robot. Biomechatronics,
BioRob 2010, pp. 15-20, 2010, doi: 10.1109/BIOROB.2010.
5626105.

E. E. Helm and D. S. Reisman, "The Split-Belt Walking Paradigm,"
Phys. Med. Rehabil. Clin. N. Am., vol. 26, No. 4, pp. 703-713,
2015, doi: 10.1016/j.pmr.2015.06.010.

Z. Zhang et al., "Gait recognition via disentangled representation
learning," arXiv, 2019.

Z. Cao, T. Simon, S. E. Wei, and Y. Sheikh, "OpenPose: Realtime
Multi-Person 2D Pose Estimation using Part Affinity Fields," Proc.—
30th IEEE Conf. Comput. Vis. Pattern Recognition, CVPR 2017,
vol. 2017-Janua, No. Xxx, pp. 1302-1310, 2017, doi: 10.1109/
CVPR.2017.143.

S. Wu, S. Zhong, and Y. Liu, "Deep residual learning for image
steganalysis," Multimedia Tools and Applications. pp. 1-17, 2017,
doi: 10.1007/s11042-017-4440-4.

X. Chen, J. Weng, W. Lu, and J. Xu, "Multi-Gait Recognition Based
on Attribute Discovery," IEEE Trans. Pattern Anal. *. Intell., vol.
40, No. 7, pp. 1697-1710, 2018, doi: 10.1109/TPAMI.2017.
2726061.

A. Graves and N. Jaitly, "Towards end-to-end speech recognition
with recurrent neural networks," 31st International Conference on
Machine Learning, ICML 2014, vol. 5. pp. 3771-3779, 2014.

I. Sutskever, O. Vinyals, and Q. V. Le, "Sequence to sequence
learning with neural networks," Adv. Neural Inf. Process. Syst., vol.
4, No. January, pp. 3104-3112, 2014.

X. Shi, Z. Chen, H. Wang, D. Y. Yeung, W. K. Wong, and W. C.
Woo, "Convolutional LSTM network: A machine learning approach
for precipitation nowcasting," Adv. Neural Inf. Process. Syst., vol.
2015-Janua, pp. 802-810, 2015.

Z. Wu, X. Wang, Y. G. Jiang, H. Ye, and X. Xue, "Modeling
spatial-Temporal clues in a hybrid deep learning framework for
video classification," MM 2015—Proc. 2015 ACM Multimed.
Conf., pp. 461-470, 2015, doi: 10.1145/2733373.2806222.

D. Dwibedi, Y. Aytar, J. Tompson, P. Sermanet, and A. Zisserman,
"Temporal cycle-consistency learning," Proc. IEEE Comput. Soc.
Conf. Comput. Vis. Pattern Recognit., vol. 2019-June, pp. 1801-
1810, 2019, doi: 10.1109/CVPR.2019.00190.

V. B. Green-Armytage, "Siamese Neural Networks for One-shot
Image Recognition Gregory," Br. Med. J., vol. 2, No. 5108, p. 1355,
1958, doi: 10.1136/bmj.2.5108.1355-c.

Y. Taigman, M. Yang, M. Ranzato, and L. Wolf, "DeepFace: Closing
the gap to human-level performance in face verification," Proc.
IEEE Comput. Soc. Conf. Comput. Vis. Pattern Recognit., pp.
1701-1708, 2014, doi: 10.1109/CVPR.2014.220.

Koch, Gregory, Richard Zemel, and Ruslan Salakhutdinov. "Sia-
mese neural networks for one-shot image recognition." ICML deep
learning workshop. vol. 2. 2015.

* cited by examiner

| Stance Phase | | | | Swing Phase | | |
|---|---|---|---|---|---|---|
| Heel strike | Loading response | Mid stance | Terminal stance | Pre-swing | Toe-off | Mid-swing | Terminal swing |
| Double Support 0-10% | | Single Support 10%-50% | | Double Support 50%-60% | | Single Support 60%-100% | |

FIG. 1

Negative image

Anchor image

Positive image

Concatenate

Classification Model
(triplet loss)

REAL-TIME, FINE-RESOLUTION HUMAN INTRA-GAIT PATTERN RECOGNITION BASED ON DEEP LEARNING MODELS

CROSS-REFERENCE TO RELATED APPLICATION

This application claims priority to and benefit of U.S. provisional patent application Ser. No. 63/224,143 filed Jul. 21, 2021, which is fully incorporated by reference and made a part hereof.

GOVERNMENT SUPPORT

This invention was made with government support under grant number 1918534 awarded by the National Science Foundation (NSF). The government has certain rights in the invention.

TECHNICAL FIELD

The present disclosure relates to devices, systems and methods related measuring movement of a person. In particular, to devices, systems and methods are described for capturing a human's walking intra-gait pattern information by identifying the human's gait automatically, quantitatively, and in real-time and fine-resolution.

BACKGROUND

Walking is a daily activity in human life. Different walking gait can reflect the mental and/or physical health condition of a person. Intra-gait cycle analysis is important in many practical areas such as athlete training, physical therapy, child autism treatment and so on. Coaches want to correct any incorrect running style/posture, physical therapists want to measure the gait cycle for post stroke rehabilitation, and autism therapists want to measure the progress that the child has been made in walking training. All those works need intra-gait analysis to be conducted automatically. It is a challenging issue to accurately identify the internal details of each human gait cycle. Although it's relatively easy to identify the inter-gait cycle (i.e., a complete walking cycle).

As noted above, human gait analysis is performed in many different areas: physical therapy, kinesiology, neurology, and so on. Conventional gait analysis requires a specialist to divide a walking cycle into different phases. In rehabilitation, treadmill assisted rehabilitation is more efficient than traditional rehabilitation. But the treadmill rehabilitation requires physical therapists to well-focus and carefully monitor the patients. In kinesiology, the study of human movement and performance is an essential topic. In neurology, walking gait can be a reference as the neurological problem of human. Therefore, a system that can classify the intra-gait phases automatically is desired. Current approaches for intra-gait phase classification are generally divided into two categories: one is sensor-based classification, the other is camera-based (thermal, RGB-D, RGB) classification.

Sensor-based classification usually requires wearable sensors to be attached to human body including accelerometers, gyroscope, force sensor and electromyography. For example, miniature linear accelerometers and angular velocity transducers have been used to detect the gait event (toe-off and heel strike). In other instances, gyroscopes and accelerometers were used to extract the entire gait cycle of the human. Force sensors built in insoles have been used to classify the initial contact (IC) and foot off (FO) gait event. Electromyography has been used to classify the stance and swing phases and so on. Wearable sensors have been widely used in gait event estimation, gait action recognition and gait analysis. However, sensor-based approaches have the disadvantage that they typically need specialist to spend time attaching the sensors to the human body. Plus, a wireless system may not stable for a long period.

Generally, camera-based classification can be divided into three categories based on the devices: thermal camera, RGB-D camera and RGB camera. Previous studies about lower limb rehabilitation used a thermal camera and insole pressure sensor to recognize and segment the motion series. In one study, a Kinect™ RGB-D camera was used to classify nine intra-gait phases: left heel strike, foot flat, right toe off, mid-stance, left heel off, right heel strike, left toe off, mid-swing and right heel off and achieved 84% accuracy. However, these methods could not be used in many real-time applications because both require sequence of data and perform the gait segmentation which is not real-time paradigm; and, an inexpensive thermal camera or RGB-D camera can't get high frame per second (FPS) compared with a conventional RGB camera.

Therefore, what are needed are systems and methods that overcome challenges in the art, some of which are described above. In particular, systems and methods are desired that provide intra-gait classification that provide fine resolution, are accurate, operate in real-time and are inexpensive to implement.

SUMMARY

Disclosed and described herein are systems and methods for intra-gait phase classification that can be easily adopted to different clinical applications. One method comprises skeleton-based gait classification where 2D skeleton information is first obtained and then the classification is performed. Another method comprises an image-based gait classification for performing classification based on image directly. Systems for implementing these methods are also disclosed and described.

In addition, the skeleton-based method achieved 0.75 accuracy with 14 FPS on the datasets collected by University of Alabama (UA). The image level-based method achieved 0.98 accuracy with 14 FPS and 0.81 accuracy with 24 FPS on the datasets collected by the University of Texas Medical Branch (UTMB). The results show the methods can be applied for post-stroke rehabilitation, athlete training, and other gait-analysis related industries.

Other systems, methods, features and/or advantages will become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 1 illustrates classifying gait phases of a normal gait-cycle of a human.

DETAILED DESCRIPTION

Figure 2:
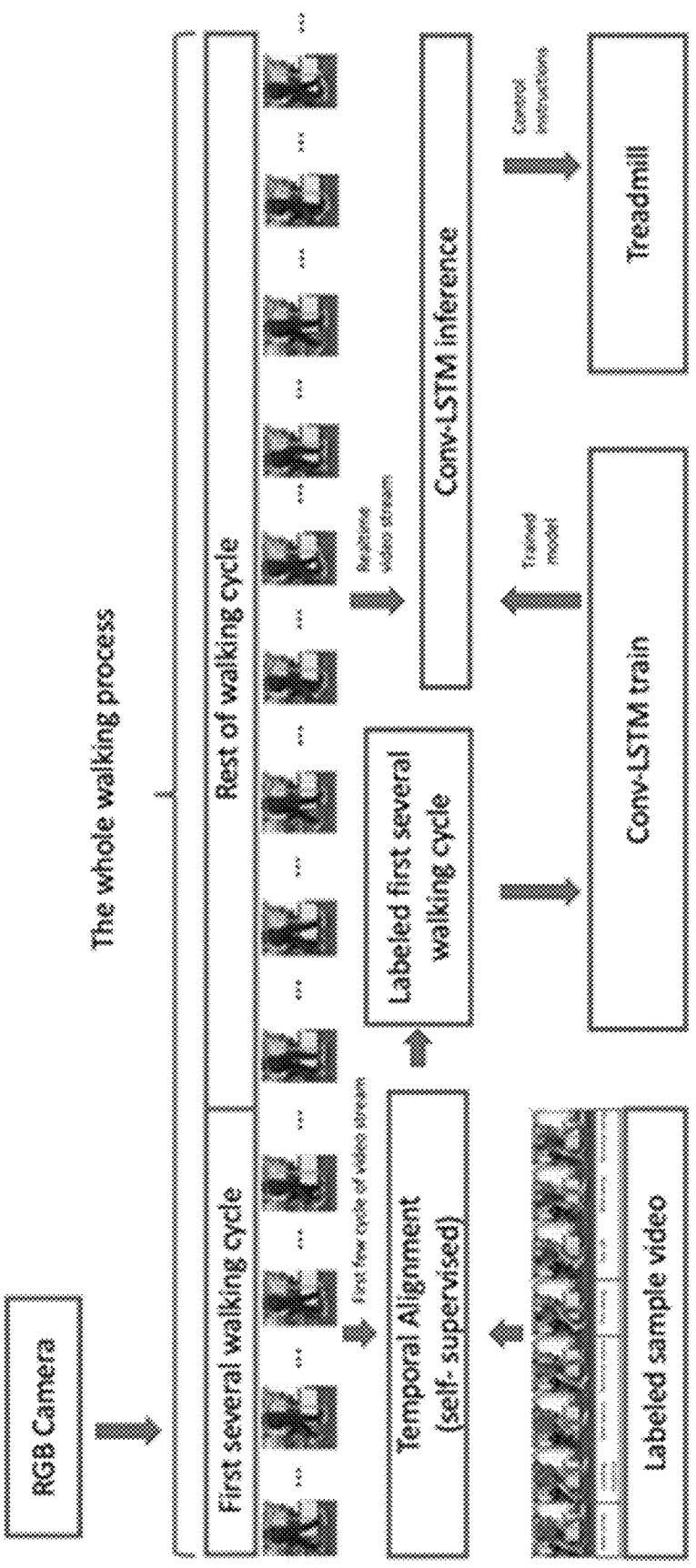
FIG. 2 illustrates an exemplary system architecture for gait phase detection.

The present disclosure relates to devices, systems and methods related measuring movement of a person. In particular, to devices, systems and methods are described for capturing a human's walking intra-gait pattern information by identifying the human's gait automatically, quantitatively, and in real-time and fine-resolution.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Gait Phases and Hemiparetic Gait Phases

Much research has been conducted to analyze human walking gait patterns. This research has led to the concept of definition of the gait phases. FIG. 1 shows image frames that illustrate two ways to separate the gait phases, where the upper row divides the gait into eight phases of the normal gait cycle including heel strike, loading response, mid-stance, terminal stance, pre-swing, toe-off, mid-swing and terminal swing. The bottom row divides the gait into four phases, with double support and single support. Some factors such as time interval between each phase, posture of each phase can be good reference for determinations about the patient in areas such as physical therapy, kinesiology, neurology, and the like. Particularly, in physical therapy for example, the time interval and posture need to be measured to tell if the human is balanced or not.

Hemiparetic gait is one kind of gait disorder that usually happens with stroke patients. It is an unbalanced walking gait caused by the weight-bearing capacity decrease of the lower limbs. A hemiparetic gait has a decreased stance phase and prolonged swing phase on the paretic side. Described herein are robust gait phase classification systems and methods that can be widely applied to both regular and irregular gaits such as hemiparetic gaits.

FIG. 2 illustrates an exemplary system architecture for gait phase detection. In FIG. 2, a whole walking process is divided into two parts, the first part is the initialization part, which is performed by by capturing the first several walking cycles of a video stream and performing temporal alignment to get the label proposed from sample video to video stream. A separate Convolutional Long Short Term Memory (LSTM) (Conv-LSTM) module is then trained by the propagated label and make prediction according to the rest of video streams.

The RGB camera records video stream and sends it to the system. The treadmill gives a slow speed to the patient for initialization. During this period, the system collects first several walking cycles of the patient. Then, the algorithm aligns the labeled sample video with unlabeled patient video stream called temporal alignment. (see D. Dwibedi, Y. Aytar, J. Tompson, P. Sermanet, and A. Zisserman, "Temporal cycle-consistency learning," Proc. IEEE Comput. Soc. Conf. Comput. Vis. Pattern Recognit., vol. 2019-June, pp. 1801-1810, 2019, doi: 10.1109/CVPR.2019.00190, https://arxiv.org/abs/1904.07846, which is fully incorporated by reference). Then, the system propagates the label from the sample video to the video stream. The labeled video stream will be feed into a Conv-LSTM network to train a small real-time inference model to achieve real time gait phase detection, though other types of classifiers may be used (SVM, CNN, etc.). Finally, the trained model is used to predict the rest of walking cycle in real time.

The benefit of setting up different modules for the temporal alignment part and inference part is that the bias of the appearance feature of the patient can be eliminated because training and testing are performed on the same subject in the inference module and in the training of the light weight network to speed up the inference process. Therefore, the inference model can be a simpler design than the temporal alignment model and with a faster inference time.

Figure 3:
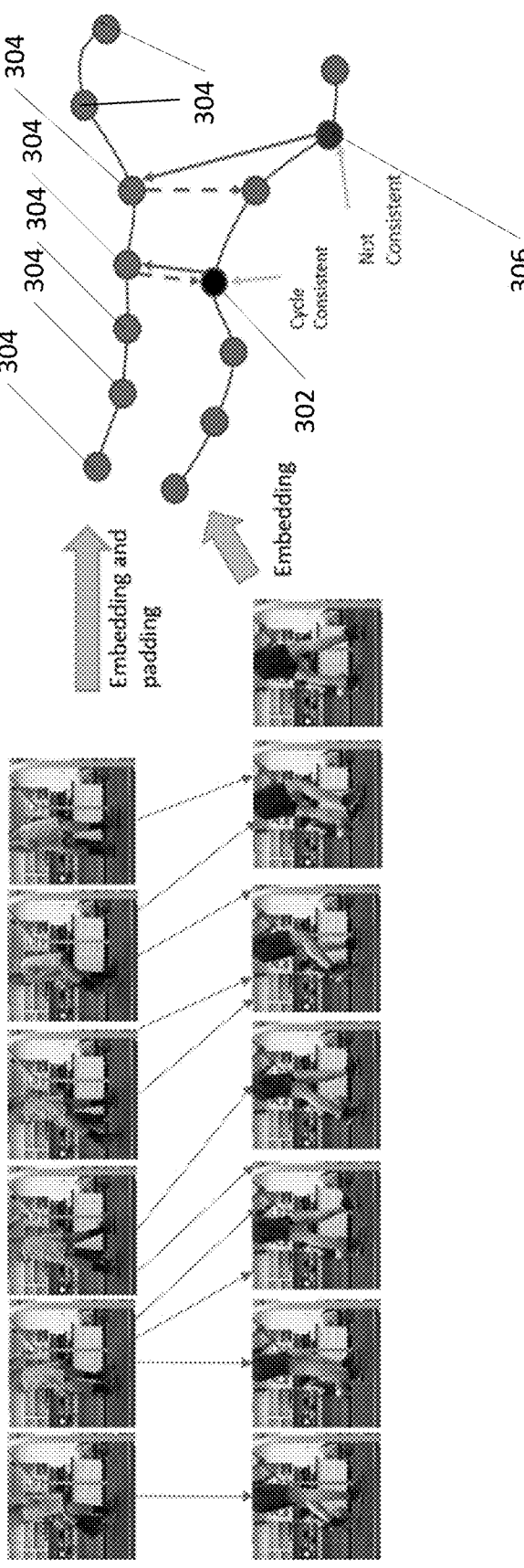
FIG. 3 illustrates temporal cycle consistency where each labeled video and video stream is embedded into embedding space using CNN.

FIG. 3 is a temporal cycle consistency illustration where each labeled video and video stream is embedded into embedding space using CNN. The black dot 302 is a cycle consistent point because it is mapped to the blue dot 304 of video stream and that dot 304 can cycle back to the black dot 302. The red dot 306 is not cycle consistent because the blue dot 304 cannot cycle back to it.

The temporal alignment module uses the idea of temporal cycle consistency. The embedding space is determined where two similar video sequences can be aligned temporally by maximizing the number of cycle consistent points. FIG. 3 shows the idea of temporal cycle consistency.

The temporal alignment module uses the idea of temporal cycle consistency. Once we have initial walking cycle $S=s_1$, $s_2, \ldots, s_N$ and labeled reference video $T=t_1, t_2, \ldots, t_M$. $s_i$ and $t_i$ denote the frames in S and T in sequence with the length N and M respectively. The embedding is calculated as $u_i=\phi(s_i)$ and $v_i=\phi(t_i)$. The nearest neighbor of $u_i$ is $v_j=\text{argmin}_{\in v}|u_i-v|$ and the nearest neighbor of $v_i$ is $u_k=\text{argmin}_{u\in U}|v_j-u|$. If and only if i=k, we call this point is a cycle consistent point. FIG. 3 shows the example of cycle consistency and not consistency.

There are two types of loss defined in the temporal alignment problem. One is cycle back classification another is cycle back regression.

Cycle-black classification loss: Assume $\tilde{v}$ is the nearest neighbor of $u_i$, the logits are calculated using the distances between $\tilde{v}$ and any $u_k \in U$. $\alpha$ is the similarity distribution which signifies the proximity between $u_i$ and each $v_j \in V$. the N class classification problem was solved by compute the predicted label $\hat{y}=\text{softmax}(x)$, where $x_k=-|\tilde{v}-u_k|^2$. Finally, the network optimizes the cross-entropy loss as Equation 2. The way to calculate a nearest neighbor is shown in Equation 1.

$$\tilde{v} = \sum_j^M \alpha_j v_j \text{ where } \alpha_j = \frac{e^{-|u_i-v_j|^2}}{\sum_k^M e^{-|u_i-v_k|^2}} \tag{1}$$

$$L_{cce} = -\frac{1}{N}\sum_{k=1}^N (y_i\log(\hat{y}_l) + (1-y_i)\log(1-\hat{y}_l)) \tag{2}$$

Cycle back regression loss: Cycle back regression loss not only measures the class it belongs to but also how close or far is the point which is cycling back. The similarity vector $\beta$ is calculated using Equation 3 below.

$$\beta_k = \frac{e^{-|\tilde{v}-u_k|^2}}{\sum_k^N e^{-|\tilde{v}-u_j|^2}} \tag{3}$$

The objective loss function is defined as the following, the first term is a Gaussian distribution term:

$$L_{cbr} = \frac{|i-\mu|^2}{\sigma^2} + \lambda\log(\sigma) \tag{4}$$

After training the network with the loss functions listed above, the label can be propagated to an unseen video data.

Conv-LSTM for Inference

Convolutional LSTM is used in the real time inference module. The equation of basic LSTM is shown below, where W is the weight of the network, x denotes the input as 1D vector, every time a new input comes, the information will be accumulated to the cell if the input gait $i_t$ is activated. The $c_{t-1}$ could discard if $f_t$ is on. Whether the latest cell output $c_t$ will be propagated to the final state $h_t$ is controlled by the ouptu gate $o_t$. $\otimes$ denotes the Hadamard product:

$$i_t=\sigma(W_{xi}x_t+W_{hi}h_{t-1}+W_{ci}\otimes c_{t-1}+b_i)$$

$$f_t=\sigma(W_{xf}x_t+W_{hf}h_{t-1}+Wcf\otimes c_{t=1}+b_f)$$

$$c_t=f_t\otimes c_{t-1}+i_t\otimes\tanh(W_{xd}x_t+W_{hc}h_{t-1}+b_c) \tag{5}$$

$$o\_t\&=\sigma(W_{xo}x_t+W_{ho}h_{t-1}+W_{co}\otimes c_t+b_o)$$

$$h_t=o_t\otimes\tanh(c_t)$$

Figure 4:
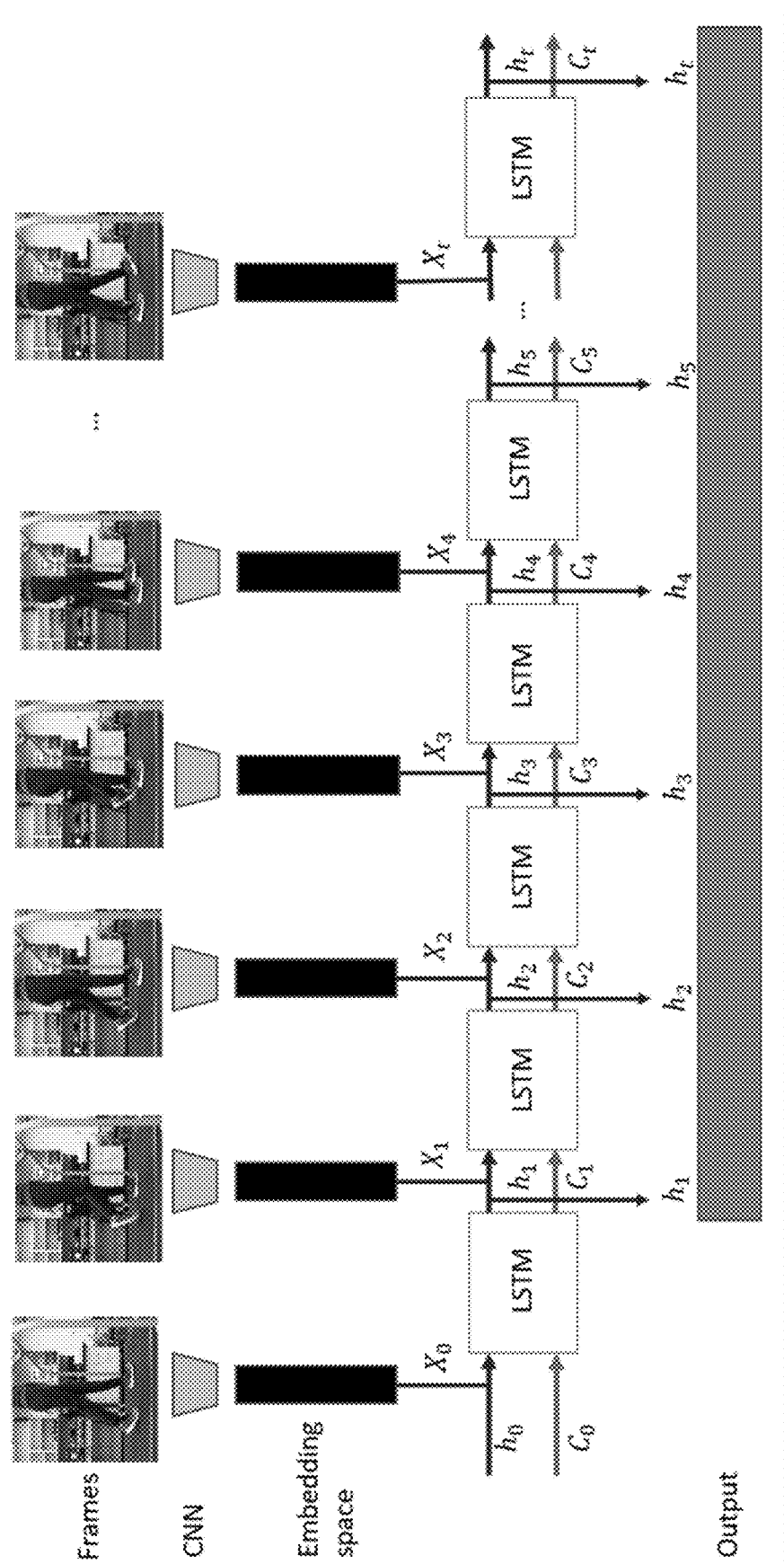
FIG. 4 illustrates the Conv-LSTM structures.

FIG. 4 shows the Conv-LSTM structures. The input x is changed to X. X represents a 2D image. The convolutional operation is performed on X with W instead of performing multiply operation between input x and W. FIG. 4 illustrates the structure of convolutions LSTM, where the LSTM network is modified from 1D vector to 2D images. The real time inference of the video stream is based on the sliding window method. If the window width is 1, the first 1 frames in video stream is picked. The sliding window will shift one frame each time and predict the label of the window.

Gait Features

A discriminative feature is needed to detect the gait phase accurately. Skeleton-based features are combinations of joint location, limb angle and so on. The discriminative feature can be extracted by using Deep Neuron Network. In one instance, the discriminative feature is extracted in a process called pose estimation. Pose estimation specifically describes joint location and skeleton extraction. It is further described, below. In other instances, other discriminative features may be used such as embedding features of an image extracted by a deep learning model (e.g. autoencoder, triplet net, convolution nets). In terms of a skeleton-based method, accurate representation of gait phases depends on the number of joints have been accurately identified.

Human eyes can discriminate the gait phase by observing the image and comparing with the concept diagram such as that shown in FIG. 1. Therefore, the pixel information of gait image can be a feature to discriminate those gait phases. Conventional gait feature extraction methods are related to human identification and hard to apply to the intra-gait classification. Therefore, a discriminative intra-gait feature that is obtained in real-time readily applicable is used for the embodiments described herein.

Skeleton-Based Intra-Gait Classification

Figure 5:
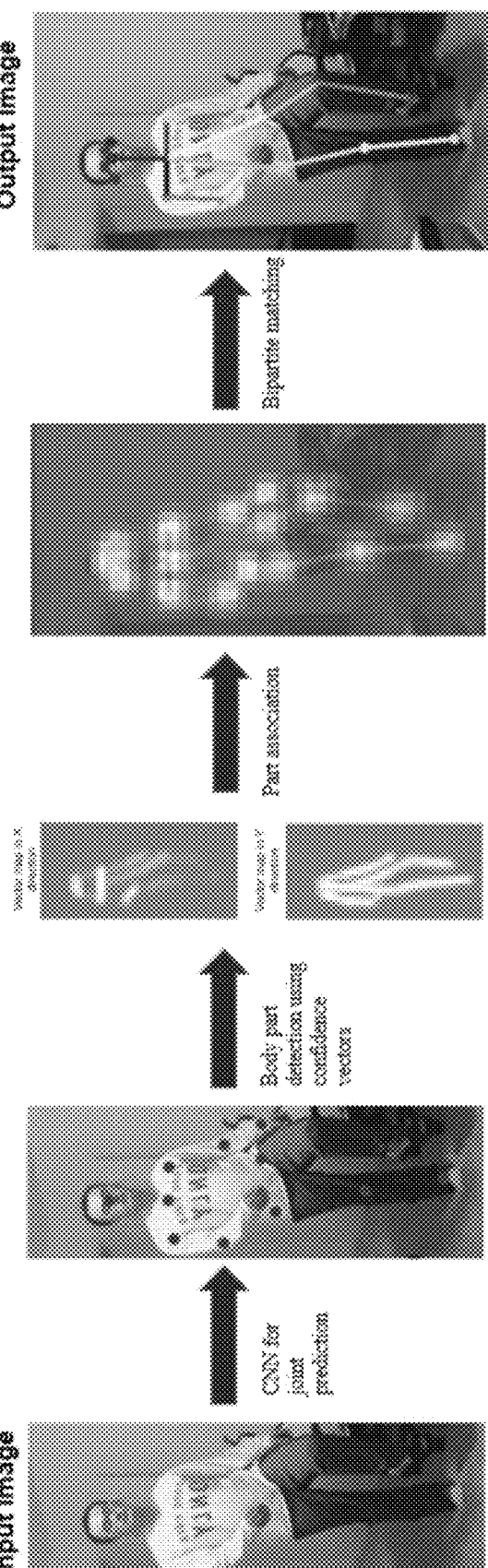
FIG. 5 illustrates a pipeline for skeleton extraction comprising: 1) feed the image into a trained CNN to perform joints prediction; 2) using confidence vectors to identify the joints location; 3) associate parts according to the confidence map; and, 4) bipartite matching to connect joints.

In one aspect, skeleton-based intra-gait recognition is used. A step in skeleton-based intra-gait recognition is pose estimation. Pose estimation estimates the joint location and limbs of a human body. A pose estimation framework, such as OpenPose [see Z. Cao, T. Simon, S. E. Wei, and Y. Sheikh, "OpenPose: Realtime Multi-Person 2D Pose Estimation using Part Affinity Fields," Proc.-30th IEEE Conf. Comput. Vis. Pattern Recognition, CVPR 2017, vol. 2017-January, no. Xxx, pp. 1302-1310, 2017, doi: 10.1109/CVPR.2017.143, which is incorporated by reference], is used for skeleton extraction. FIG. 5 illustrates a pipeline for skeletal extraction. The pipeline illustrates the steps in using a pre-trained network to predict the joints as shown in Table 1, below.

TABLE 1

| Joint data | | | |
| --- | --- | --- | --- |
| $(x_0, y_0)$ | Nose | $(x_8, y_8)$ | Right eye |
| $(x_1, y_1)$ | Sternum | $(x_9, y_9)$ | Left ear |
| $(x_2, y_2)$ | Right shoulder | $(x_{10}, y_{10})$ | Left shoulder |
| $(x_3, y_3)$ | Right elbow | $(x_{11}, y_{11})$ | Left elbow |
| $(x_4, y_4)$ | Right wrist | $(x_{12}, y_{12})$ | Left wrist |
| $(x_5, y_5)$ | Right hip | $(x_{13}, y_{13})$ | Left hip |
| $(x_6, y_6)$ | Right knee | $(x_{14}, y_{14})$ | Left knee |
| $(x_7, y_7)$ | Right ankle | $(x_{15}, y_{15})$ | Left ankle |
| $(x_{16}, y_{16})$ | Left eye | $(x_{17}, y_{17})$ | Left ear |

The pipeline comprises a model that takes an image X, with size w×h, then feed X into a trained convolutional neural network (CNN) to produce a confidence map with a set of 2D vector fields of part affinity fields (PFA) to represent the joint pixels and degree association between parts accordingly. Then, the model performs part association to produce a list of joint locations information in terms of $(x_i, y_i)$, $0 < x < 1$, $0 < y < 1$, $0 \le i \le 17$. $x_i, y_i$ represent the (distance from left)/w and (distance from top)/h, respectively.

Classification

For a simple comparison, suppose ankle joints A, $(x_{15}, y_{15})$ and B, $(x_7, y_7)$ were chosen. If $y_{15} - y_7 >$ threshold, it is a single support phase with left leg in air and about to enter the double support phase, as shown in FIG. 1. If $y_7 - y_{15} >$ threshold, it is a single support phase with right leg in air and about to enter the double support phase. If $\|y_{15} - y_7\| <$ threshold, it's double support phase with both legs hitting the ground. Using a hard threshold is simple to achieve, but it's difficult to apply it to clinic applications directly. The threshold is hard to define, because different persons, different diseases and different walking speeds may have different threshold. It is not convenient to set different threshold in different situation.

Classification Models with Joint Information

All the joints in the lower limb are considered as useful features. Instead of using only two joints, six joints (x, y) with 12 parameters from the lower body include knees, ankles, and hips are obtained. Then, several classification models are applied in this scenario including one or more of regression models, a random forest model, support vector machine, and the like, which are all good methods to classify this kind of data.

Classification with Temporal Information

There are more gait features in a video than in a single still image for humans. The changes between consecutive frames are good for discriminate intra-gait phases. Therefore, another feature that is based on temporal information is used—multiple consecutive frames can be used to construct the discriminative feature. For example, images of six joints of the lower body are collected in each frame and the previous frame is subtracted from the latter frame to construct the temporal feature. Those temporal features provide discriminative features for classification.

Image Level Intra-Gait Classification

The above-described skeleton-based feature is the abstraction of the discriminative intra-gait feature. It is robust to the variation of people such as age, height, dress and so on. However, it misses some information too. It is hard for human to tell which gait phase it belongs to by giving only a skeleton of a person without image context (i.e., ground, shape of foot etc.). The image contains more discriminative gait-feature other than the skeleton alone. Directly applying deep learning to an image is another approach for intra-gait phases classification.

CNN Model for Image Classification

Figure 6:
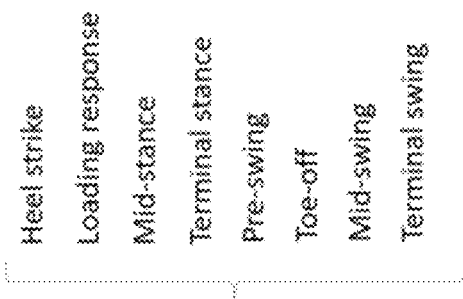
FIG. 6 illustrates a simple CNN design for image classification.
Figure 6:
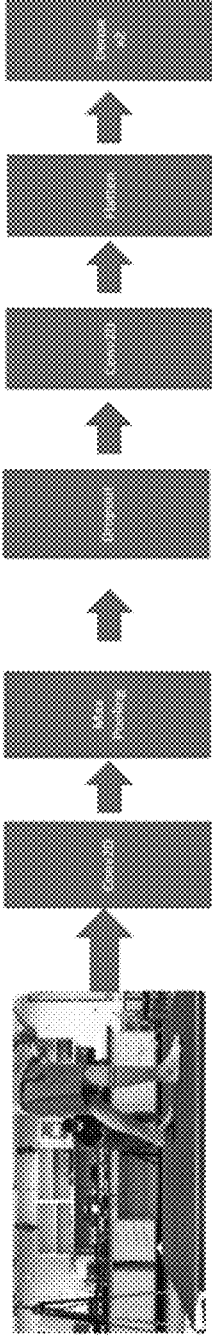

Convolutional neural networks (CNNs) have been widely used in computer vision community. A CNN is a Deep Learning algorithm which can take in an input image, assign importance (learnable weights and biases) to various aspects/objects in the image and be able to differentiate one from the other. By adding a convolutional layer, the network can extract more abstract feature from an image. A network is developed to map the extracted feature with different phase categories. A simple CNN design as shown in FIG. 6. In the illustrated example, input image size is 320×180. The filter size of the first and second convolution layer are 64×64 and 32×32, with padding. The last two dense layers are dense to 128 and 8, respectively.

Loss Function

Referring to Equation (2), above, in some instances, categorical cross entropy is used for the loss function. This loss function is widely used in object classification tasks. $y_i$ is the true label, $\hat{y}_i$ is the predicted label, N is the number of training image.

Siamese Network

The concept of a Siamese network was introduced in the early 1990s to solve the signature verification [see Koch, Gregory, Richard Zemel, and Ruslan Salakhutdinov. "Siamese neural networks for one-shot image recognition." ICML deep learning workshop. Vol. 2. 2015; and Y. Taigman, M. Yang, M. Ranzato, and L. Wolf, "DeepFace: Closing the gap to human-level performance in face verification," Proc. IEEE Comput. Soc. Conf. Comput. Vis. Pattern Recognit., pp. 1701-1708, 2014, doi: 10.1109/CVPR.2014.220, both of which are fully incorporated by reference.]

Figure 7:
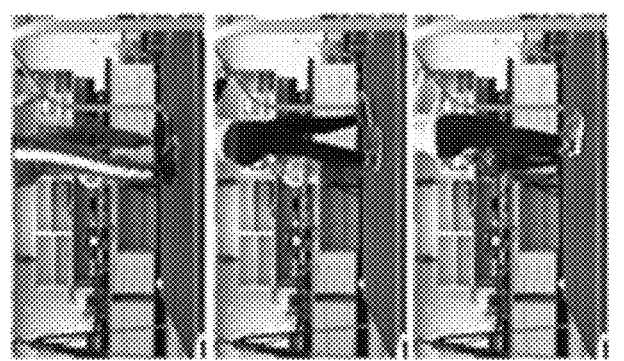
FIG. 7 illustrates a triplet loss gait classification method.
Figure 7:
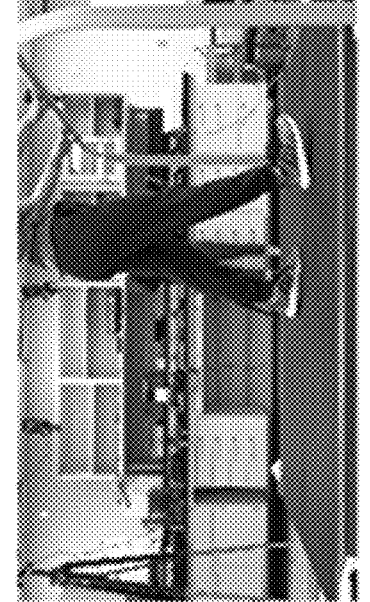
Figure 7:
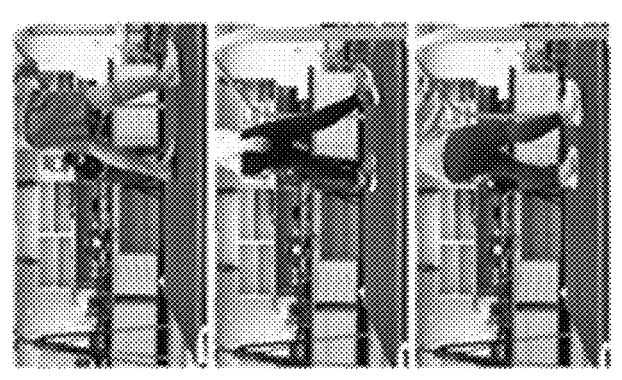

Siamese networks have been used to deal with one-shot learning problems in facial recognition. Instead of classifying the images directly, this network is created to verify if two images are similar. The training part of Siamese network is to train a verification network. The inference part is to perform the verification task among all the reference and test images. It picks the most similar reference image and determines whether the test image belongs to the same category as the reference image. In this way, the classes can be expanded without retraining the CNN. The image of different people in different gait phases are paired. As illustrated in FIG. 7, the datasets were randomly split into three categories with an anchor image and a positive image, which is the same class as anchor image, and a negative image, which is not the same class as anchor image. Those three categories are concatenated and fit into a triplet module. A loss function is defined as $\mathcal{L}(A, P, N) = \max(\|f(A) - f(P)\|^2 - \|f(A) - f(N)\|^2 + \alpha, 0)$. The triplet loss maximizes distance with negative images and minimizes the distance with positive images. This embedding is used to train the network.

In its training phase, the inputs are paired images, the output is the predicted label of an input pair. This setup can produce more training data than normal training procedures. For example, eight gait phases will result in 8×8=64 combinations. If each phase has 10 images, then the combination becomes 80×80=6400 combinations. Another benefit is that this network can be easily expanded to other applications such as hemiparetic intra-gait classification by providing the reference image of hemiparetic gait phases. The loss for this approach is the categorical cross entropy loss.

Figure 8:
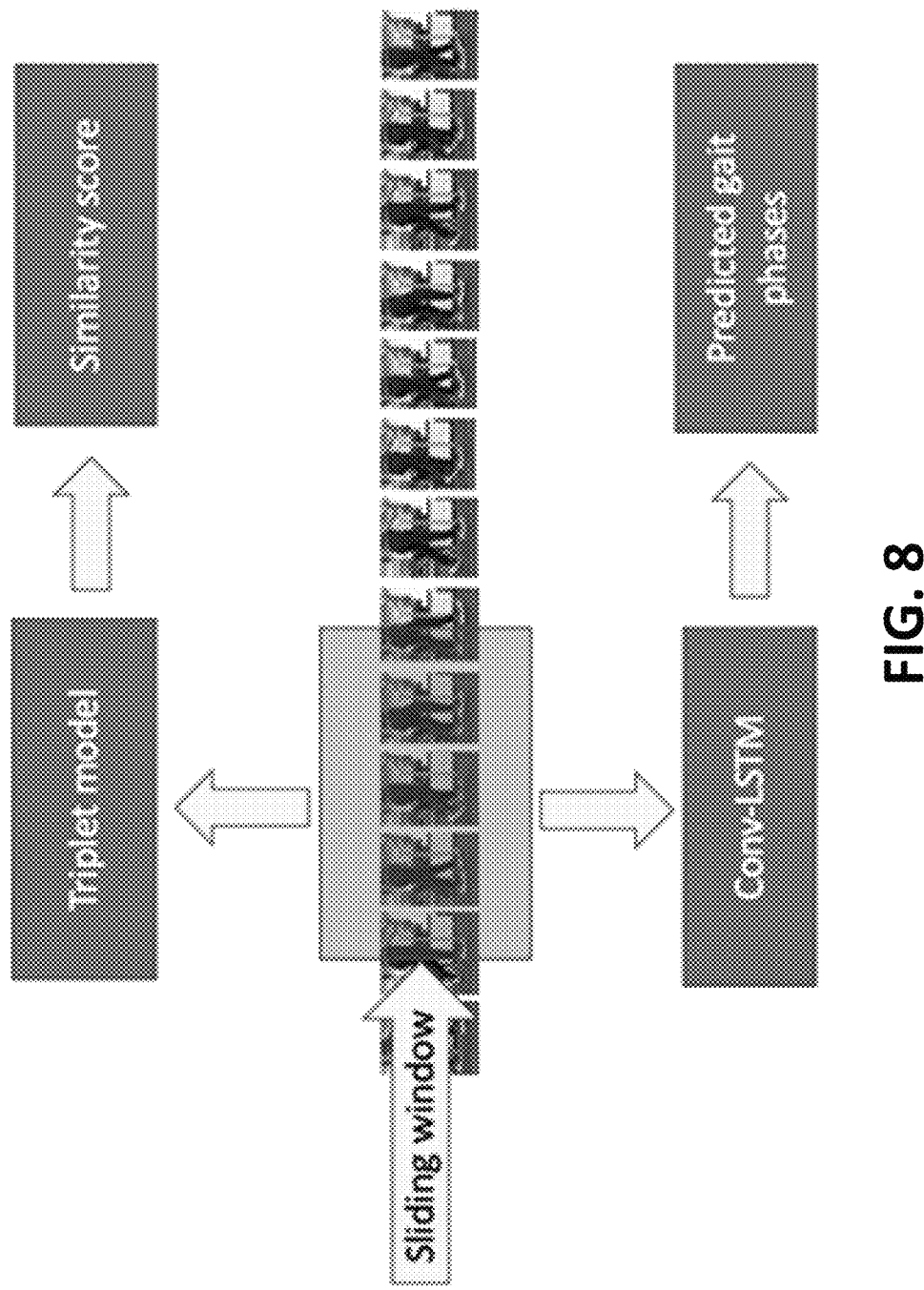
FIG. 8 illustrates an application of Conv-LSTM inference.

FIG. 8 shows how Conv-LSTM inference works. A sliding window is used to capture all the frames and feed them into the Conv-LSTM to predict the gait phases. To optimize or adjust the system, the triplet model setup predicts a similarity score. The similarity score threshold can be adjusted to the gait phase that is desired to be captured.

Eliminating Appearance Feature Bias

The variation of the appearance can be an obstacle for the gait phase classification task. People wearing similar cloth might be classified into the same gait phase. Therefore, it is important to carefully design a loss function and train properly to eliminate the bias of the appearance.

Therefore, a training paradigm is used to learn the gait feature only. $f_a$ is denoted as the feature of appearance feature, $f_g$ is the gait feature. It is desired to have a model that can extract the $f_g$ and ignore the $f_a$. The loss for similarity verification is defined as take the $f_g$ feature and perform mean squared error of two features extract from paired image.

Figure 9:
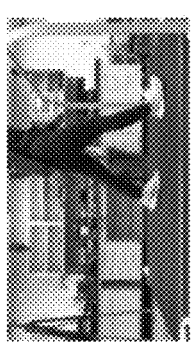
FIG. 9 illustrates an example of a gait-feature learning network.
Figure 9:
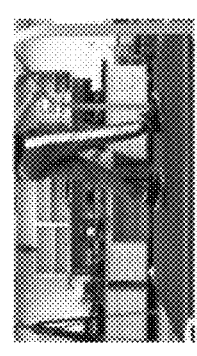
Figure 9:
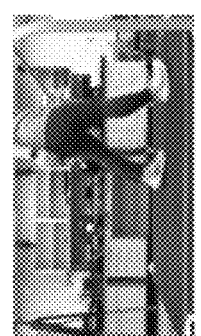
Figure 9:
Figure 9:
Figure 9:
Figure 9:
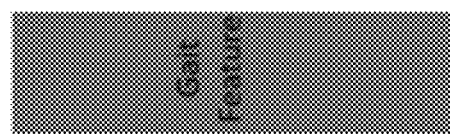
Figure 9:
Figure 9:
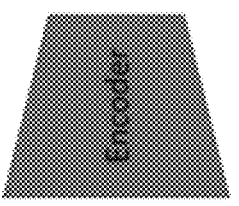
Figure 9:
Figure 9:
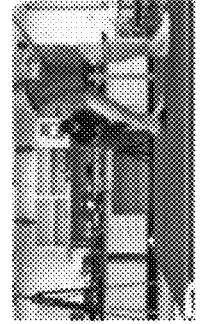

$f_g$ is extracted by pairing the different people with same gait and using an encoder and decoder. $\mathcal{E}$ is the encoder, $\mathcal{D}$ is the decoder, $I_{original}$ is the image that need to be encoded, $I_{paired}$ is the image that has been paired. $\tilde{I}$ is the reconstructed image using $f_g$. After obtaining the gait feature, classification is performed using the Siamese network with loss $L_{gait}$. FIG. 9 illustrates the feature learning framework:

$$f_g = \mathcal{E}(I_{original}),\ \tilde{I} = \mathcal{D}(f_g),\ \mathcal{L}_{recon} = \left\|\tilde{I} - I_{paired}\right\|_2^2,$$

$$L_{gait} = \left\|\frac{1}{N}\sum_n^N f_g^{(c_1)} - \frac{1}{N}\sum_n^N f_g^{(c_2)}\right\|_2^2$$

Figure 10:
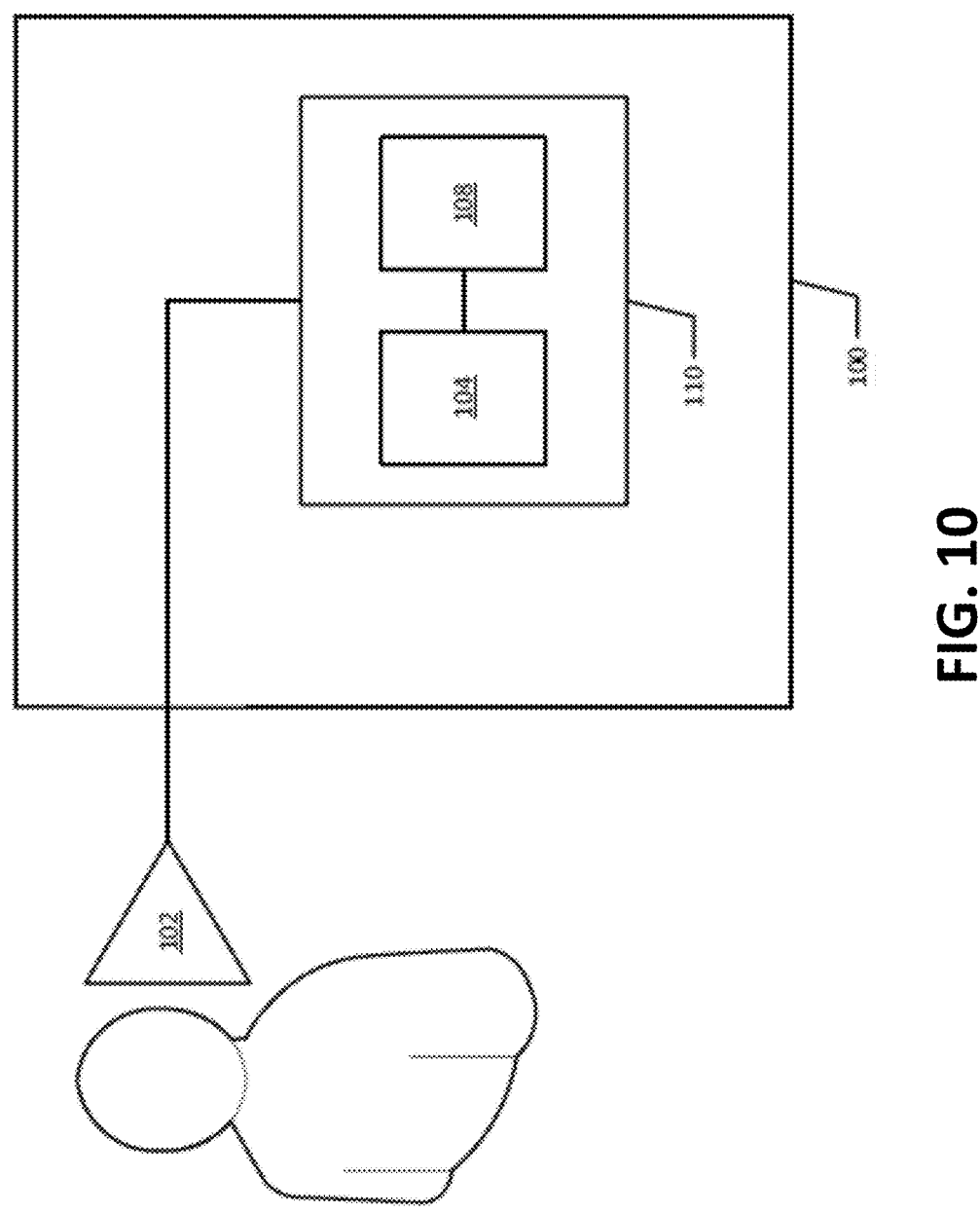
FIG. 10 illustrates an exemplary overview system for classifying gait phase of a human from images.

FIG. 10 illustrates an exemplary overview system for classifying gait phase of a human from images. As shown in FIG. 10, one embodiment of the system 100 comprises an image capture mechanism 102. In one aspect, the image capture mechanism 102 can be a camera. The image capture mechanism 102 can take still and/or video images. Generally, the image capture mechanism 102 will be a digital camera, but can be an analog device equipped with or in communication with an appropriate analog/digital converter. The image capture mechanism 102 may also be a webcam, scanner, recorder, or any other device capable of capturing a still image or a video.

As shown in FIG. 10, the image capture mechanism 102 is in direct communication with a computing device 110 through, for example, a network (wired (including fiber optic)), wireless or a combination of wired and wireless) or a direct-connect cable (e.g., using a universal serial bus (USB) connection, IEEE 1394 "Firewire" connections, and the like). In other aspects, the image capture mechanism 102 can be located remotely from the computing device 110, but capable of capturing an image and storing it on a memory device such that the image can be downloaded or transferred to the computing device 110 using, for example, a portable memory device and the like. In one aspect, the computing device 110 and the image capture mechanism 102 can comprise or be a part of a device such as a smart device, smart phone, tablet, laptop computer or any other fixed or mobile computing device.

In a basic configuration, the computing device 110 can be comprised of a processor 104 and a memory 108. The processor 104 can execute computer-readable instructions that are stored in the memory 108. Moreover, images captured by the image capture device 102, whether still images or video, can be stored in the memory 108 and processed by the processor 104 using computer-readable instructions stored in the memory 108.

The processor 104 is in communication with the image capture device 102 and the memory 108. The processor 104 can execute computer-readable instructions stored on the memory 108 to capture, using the image capture device 102, an image. In one aspect, the captured image can include an image of the lower body (e.g., hips, knees and ankles) of a subject.

The processor 104 can further execute computer-readable instructions stored on the memory 108 to capture, using the image capture device 102, one or more digital images and classify gait phases from the one or more images.

The system has been described above as comprised of units. One skilled in the art will appreciate that this is a functional description and that the respective functions can be performed by software, hardware, or a combination of software and hardware. A unit can be software, hardware, or a combination of software and hardware. The units can comprise software for discriminating tissue of a specimen. In one exemplary aspect, the units can comprise a computing device that comprises a processor 921 as illustrated in FIG. 11 and described below.

Figure 11:
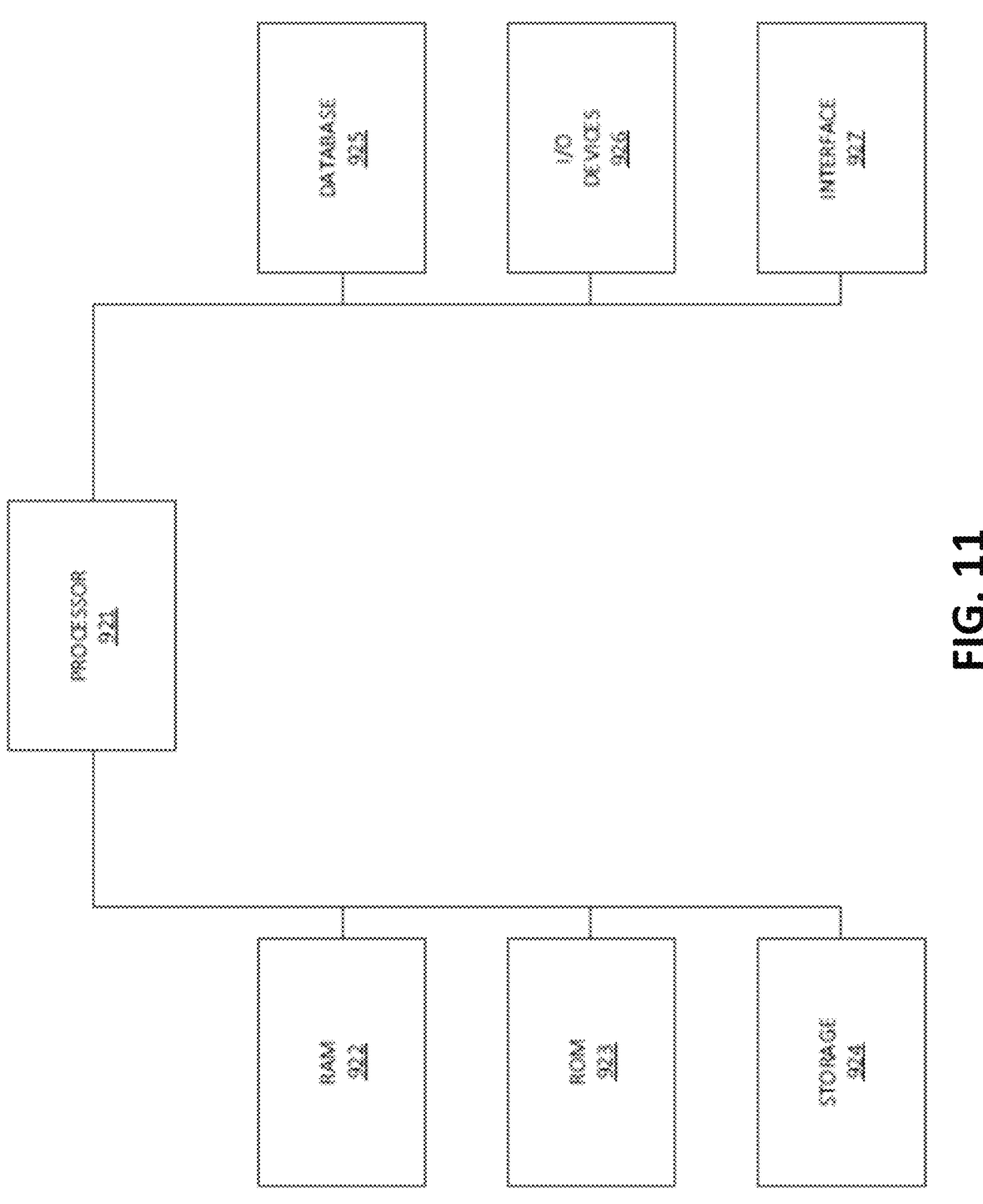
FIG. 11 illustrates an exemplary computer for use with the disclosed embodiments.

FIG. 11 illustrates an exemplary computer that can be used for classifying gait phases from images. As used herein, "computer" may include a plurality of computers. The computers may include one or more hardware components such as, for example, a processor 921, a random access memory (RAM) module 922, a read-only memory (ROM) module 923, a storage 924, a database 925, one or more input/output (I/O) devices 926, and an interface 927. Alternatively and/or additionally, the computer may include one or more software components such as, for example, a computer-readable medium including computer executable instructions for performing a method associated with the exemplary embodiments. It is contemplated that one or more of the hardware components listed above may be implemented using software. For example, storage 924 may include a software partition associated with one or more other hardware components. It is understood that the components listed above are exemplary only and not intended to be limiting.

Processor 921 may include one or more processors, each configured to execute instructions and process data to perform one or more functions associated with a computer for classifying gait phases of a subject based upon one or more images. Processor 921 may be communicatively coupled to RAM 922, ROM 923, storage 924, database 925, I/O devices 926, and interface 927. Processor 921 may be configured to execute sequences of computer program instructions to perform various processes. The computer program instructions may be loaded into RAM 922 for execution by processor 921.

RAM 922 and ROM 923 may each include one or more devices for storing information associated with operation of processor 921. For example, ROM 923 may include a memory device configured to access and store information associated with the computer, including information for identifying, initializing, and monitoring the operation of one or more components and subsystems. RAM 922 may include a memory device for storing data associated with one or more operations of processor 921. For example, ROM 923 may load instructions into RAM 922 for execution by processor 921.

Storage 924 may include any type of mass storage device configured to store information that processor 921 may need to perform processes consistent with the disclosed embodiments. For example, storage 924 may include one or more magnetic and/or optical disk devices, such as hard drives, CD-ROMs, DVD-ROMs, or any other type of mass media device.

Database 925 may include one or more software and/or hardware components that cooperate to store, organize, sort, filter, and/or arrange data used by the computer and/or processor 921. For example, database 925 may store digital images and/or video of a subject walking and/or running along with computer-executable instructions for analyzing the images to determine gait phases. It is contemplated that database 925 may store additional and/or different information than that listed above.

I/O devices 926 may include one or more components configured to communicate information with a user associated with computer. For example, I/O devices may include a console with an integrated keyboard and mouse to allow a user to maintain a database of digital images, results of the analysis of the digital images, metrics, and the like. I/O devices 926 may also include a display including a graphical user interface (GUI) for outputting information on a monitor. I/O devices 926 may also include peripheral devices such as, for example, a printer for printing information associated with the computer, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 927 may include one or more components configured to transmit and receive data via a communication network, such as the Internet, a local area network, a workstation peer-to-peer network, a direct link network, a wireless network, or any other suitable communication platform. For example, interface 927 may include one or more modulators, demodulators, multiplexers, demultiplexers, network communication devices, wireless devices, antennas, modems, and any other type of device configured to enable data communication via a communication network.

EXPERIMENTS/EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process.

Data Acquisition

Figure 12:
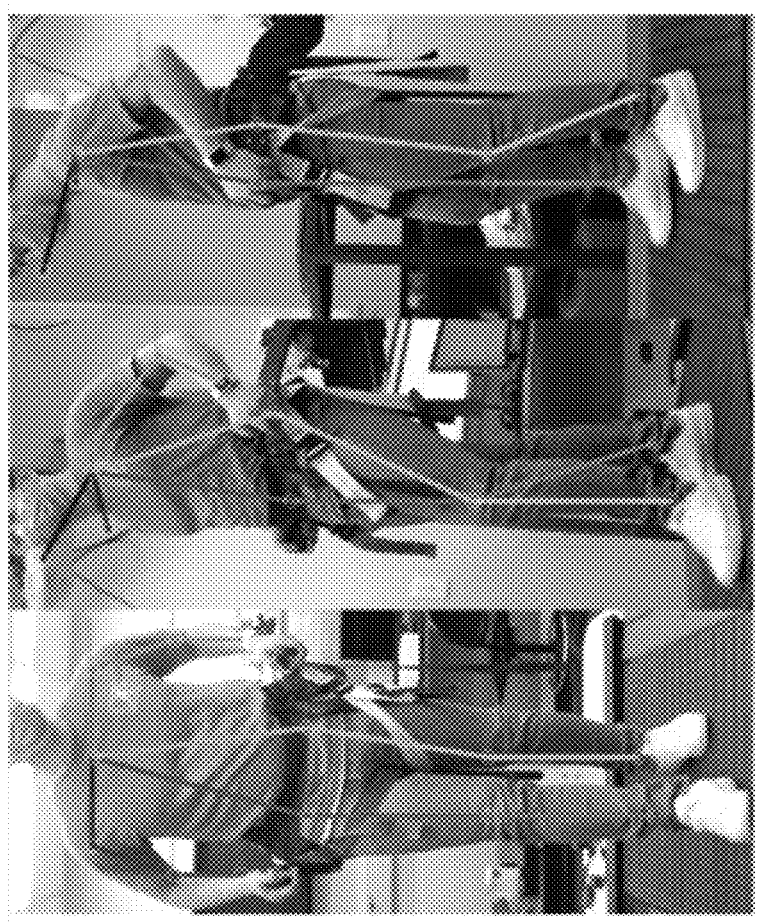
FIG. 12 illustrates different views captured in a dataset.

Two different datasets were collected to verify the concept of gait classification and temporal alignment. The first dataset was collected at the University of Alabama. There were three subjects walking on the treadmill with support and each subject is given the speed of 0.5 m/s, 1.0 m/s and 1.5 m/s. The videos are captured in three different perspectives: from the front, from the side and from 45 degree as shown in FIG. 12. This dataset was used to verify the skeleton-based model accuracy. Upper and lower body parts are included for the dataset.

The other dataset was collected from the University of Texas Medical Branch (UTMB) and is comprised of data from 34 healthy participants walking on a split-belt treadmill with sagittal plane video at 60 FPS. People are divided into three groups and each group starts from speed 0 to the highest speed for both belts and then changes to the speed as follows: Group A is captured with right belt speed equal to 1.5 m/s, left belt speed equal to 0.5 m/s for male and right belt speed equal to 1.0 m/s, left belt speed equal to 0.5 m/s for female. Group B is captured with right belt speed equal to 1.3 m/s vs left belt speed equal to 0.7 m/s for male, and right belt speed equal to 1.0 m/s and left belt speed equal to 0.5 for female. Group C is captured with right belt speed 1.2 vs left belt speed 0.6 for all subjects. Group A and C contains 11 subjects and Group B contains 12 subjects.

It was found that a single frame label is not enough to evaluate all the methods. Those methods with Conv-LSTM require a sliding window. If the width of the window is 1, the input of the network should be 1 and the output should be one. This is a many to one training paradigm, a label needs to be assigned to each window. Specifically, the last frame of the window is picked as the label of the window. Another way to train the Conv-LSTM is to use the many to many paradigm, this allows use of all the labels of images, but the frames still need to be grouped as input data.

Classification Model Performance with Skeleton Based Classification

Figure 13:
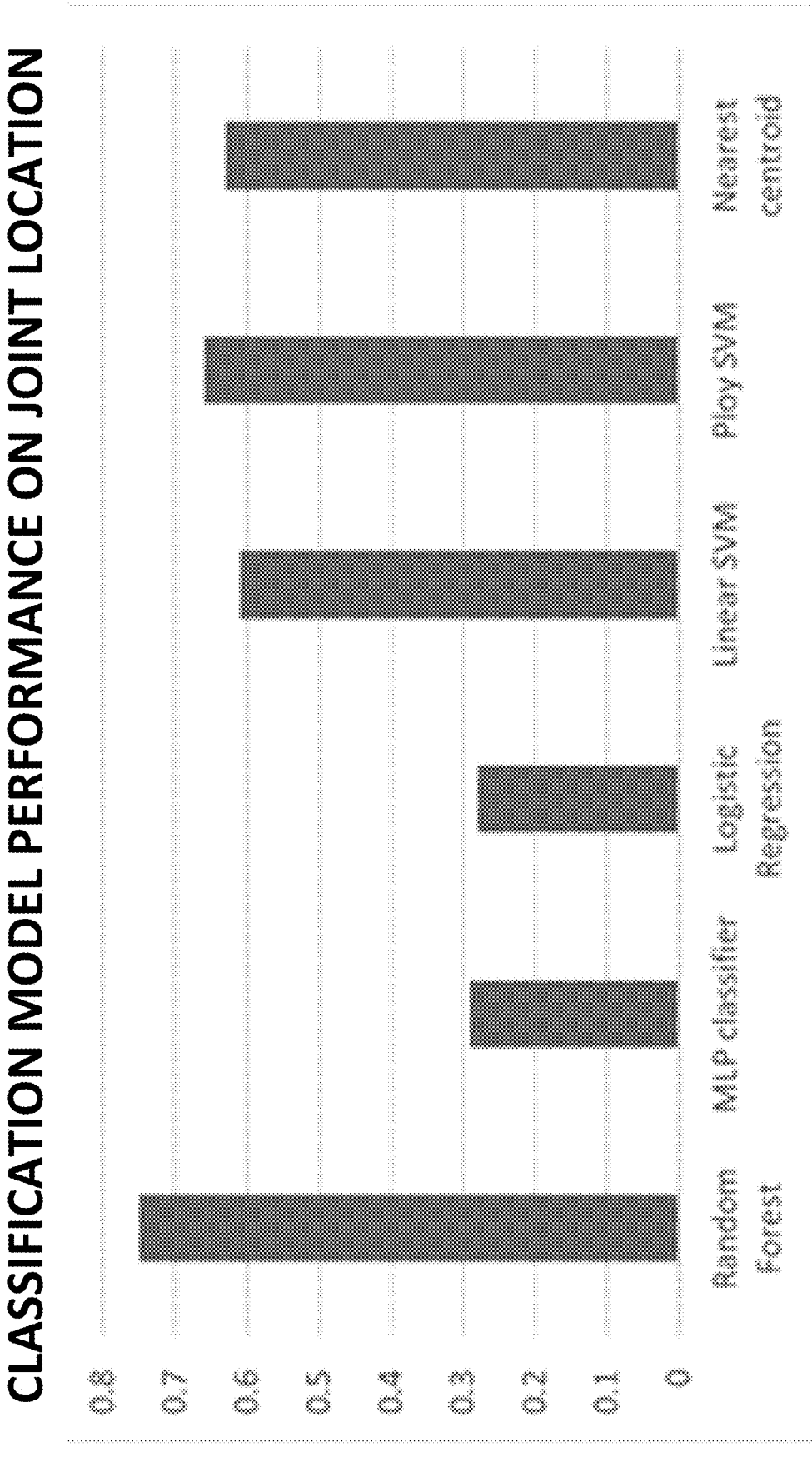
FIG. 13 illustrates classifier performance.

The experiment was performed the UA dataset. First, the OpenPose framework is used to extract the skeleton, then extract the lower body joints as described herein. 14 FPS were obtained on a 1080 Ti GPU and Intel i7-7700k. One subject was used to train the classifier and the classifier was tested on another subject. The overall accuracy was illustrated in FIG. 13. The random forest classifier achieves the highest performance with accuracy of 0.75.

Figure 14:
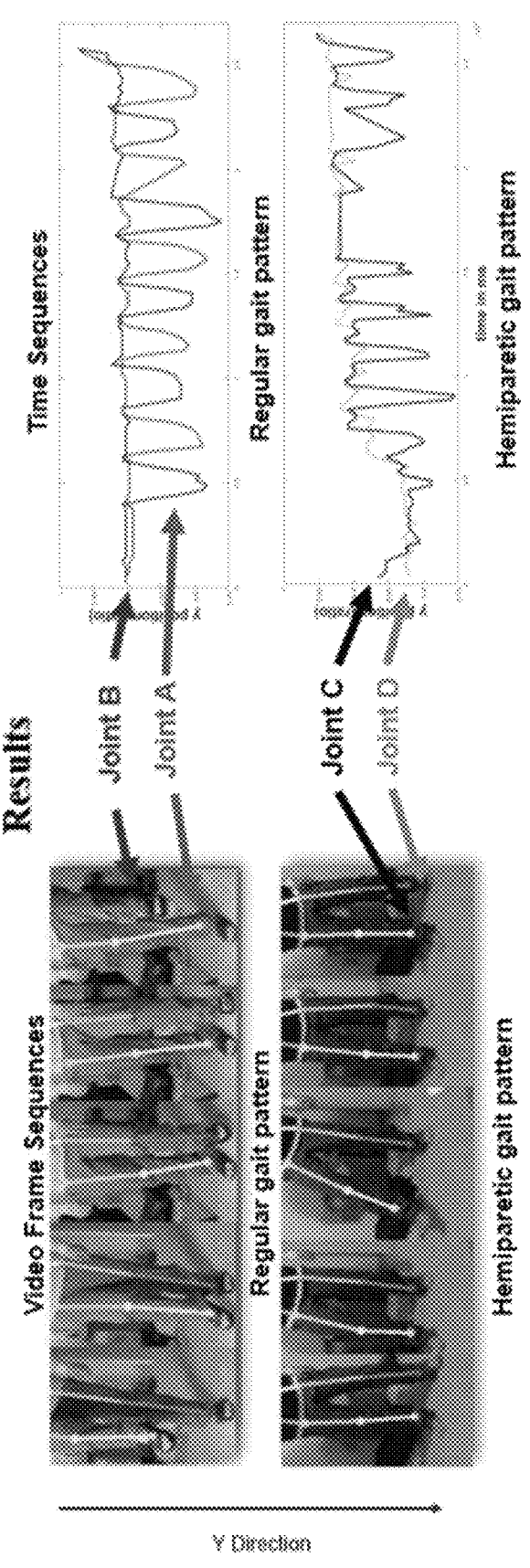
FIG. 14 illustrates a regular gait compared to a hemiparetic gait.

It is to be noted that the skeleton based model can be implemented to plot the joints vs time graph. From FIG. 14, hemiparetic gait can be detected by observing the plot directly.

In some instances, the skeleton based method sometimes cannot correctly predict joints in each frame, especially when the side-view setup is used. Table 3 illustrates the missing rate of the methods. 0_5 means zero degree with human faced direction and speed 0.5. The pose estimation network has a high miss rate that can't guarantee the performance when putting the camera at the side of the human body. The frontal view is better in skeleton-based approach.

TABLE 3

| | | | Miss rate for pose estimation in different subjects and view port | | | | | | |
|---|---|---|---|---|---|---|---|---|---|
| | 0_5 | 0_10 | 0_15 | 45_5 | 45_10 | 45_15 | 90_5 | 90_10 | 90_15 |
| Subject1 | 0 | 0 | 0 | 0.072 | 0.076 | 0.088 | 0.78 | 0.5 | 0.5 |
| Subject2 | 0 | 0 | 0 | 0.15 | 0.17 | 0.107 | 0.44 | 0.46 | 0.34 |
| Subject3 | 0 | 0 | 0 | 0.39 | 0.38 | 0.34 | 0.80 | 0.9 | 0.83 |

Image Level Classification

As described herein, a second method of gait classification comprises image level classification.

Figures 15A, 15B:
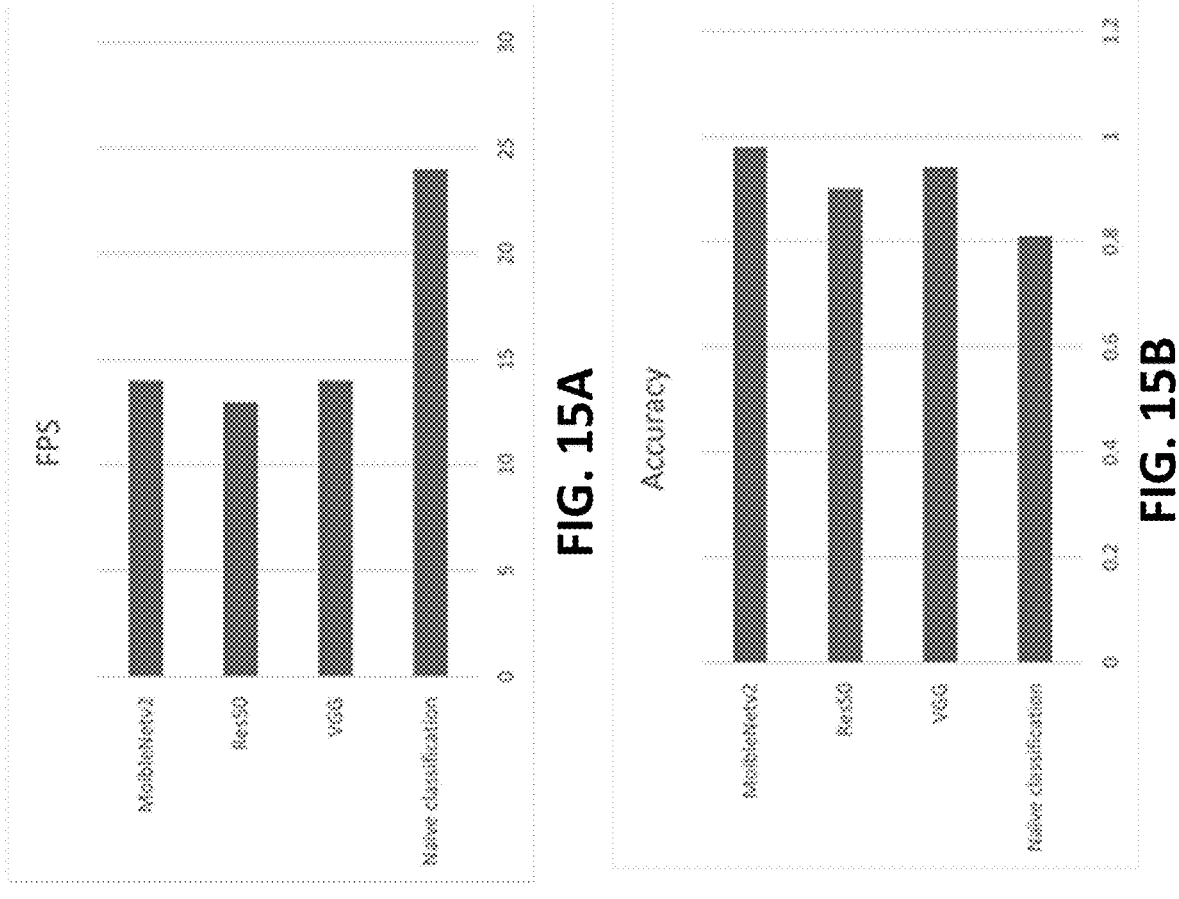
FIGS. 15A and 15B illustrate image level gait classification accuracy and feet per second (FPS).

Image level gait classification was performed using the model described herein. One-third of the video frames were used for training and the rest of them for testing. A high accuracy was obtained in this setup from single subject testing. If the VGG feature, Res50 or MobileNetv2 feature were added into the network, an even higher accuracy was obtained, but the FPS drops dramatically, as shown in FIGS. 15A and 15B.

DISCUSSION

Comparison Between Two Methods

The disclosed skeleton-based method is straightforward and is easy to generalize to different applications. However, it requires larger computational power. If a real-time system is desired, a faster GPU to have better performance. Image level-based classification can be faster than the skeleton-based method. But it's harder to generalize. So, a framework was specifically designed to enhance the image level classification generalization by using Siamese network and specifically designed the gait feature extraction framework to make it robust.

Other Applications

Other applications of the disclosed systems, devices and methods include body training effect measurement, quantitative medical rehabilitation, athlete training, autism training, military/police training applications, and the like.

Body Training Effect Measurement

The gait classification system can be seamlessly integrated with treadmill-based body training. It can be used to accurately measure the body training progress/effects under different treadmill speed.

Quantitative Medical Rehabilitation

In the nation, there are millions of post-stroke patients who need long-term rehabilitation. The disclosed methods can be used to help physical therapy to obtain detailed intra-gait classification.

Athlete Training

How is each detail of the athlete's posture captured in real time and analyzed to detect problems to be addressed in the future training? For example, in a 100 m running training, it is important to identify the speed differences between two legs and make new training plan to make up for such difference. In football quarterback training, the ball-throwing posture needs to be detailly analyzed. The disclosed methods can provide this type of analysis, and can be used for upper-limb posture analysis, too.

Autism Kids Training

There are millions of kids affected by autism. Many kids show imbalanced posture in either upper or lower limbs. Current technologies cannot accurately identify the gait features and training progress. The disclosed methods can be used in the home environment and automatically identify the training progress.

Soldier/Policeman Training

The disclosed systems, devices and methods can also be used to analyze the fine-level details on gesture/posture. It can be easily integrated with Virtual Reality (VR) technology to achieve a close-to-reality soldier/policeman/pilot training.

CONCLUSION

It will be understood that each step of a method, block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language and it may be combined with hardware implementations.

While this specification contains many specific implementation details, these should not be construed as limitations on the claims. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Throughout this application, various publications may be referenced. The disclosures of these publications in their entireties are hereby fully incorporated by reference into this application in order to more fully describe the state of the art to which the methods and systems pertain. Each of the below are fully incorporated by reference and made a part hereof:

[1] J. M. Jasiewicz et al., "Gait event detection using linear accelerometers or angular velocity transducers in able-bodied and spinal-cord injured individuals," Gait Posture, vol. 24, no. 4, pp. 502-509, 2006, doi: 10.1016/j.gaitpost.2005.12.017.

[2] E. Schoitsch, Try Walking in My Shoes, if You Can: Accurate Gait Recognition Through Deep Learning, vol. 10489 LNCS. 2017.

[3] P. Catalfamo, D. Moser, S. Ghoussayni, and D. Ewins, "Detection of gait events using an F-Scan in-shoe pressure measurement system," Gait Posture, vol. 28, no. 3, pp. 420-426, 2008, doi: 10.1016/j.gaitpost.2008.01.019.

[4] C. Schreiber and F. Moissenet, "A multimodal dataset of human gait at different walking speeds established on injury-free adult participants," Sci. Data, vol. 6, no. 1, pp. 1-7, 2019, doi: 10.1038/s41597-019-0124-4.

[5] M. Li, S. Tian, L. Sun, and X. Chen, "Gait analysis for post-stroke hemiparetic patient by multi-features fusion method," Sensors (Switzerland), vol. 19, no. 7, 2019, doi: 10.3390/s19071737.

[6] C. Morbidoni, A. Cucchiarelli, S. Fioretti, and F. Di Nardo, "A deep learning approach to EMG-based classification of gait phases during level ground walking," Electron., vol. 8, no. 8, 2019, doi: 10.3390/electronics8080894.

[7] R. Ma and F. Hu, "An Intelligent Thermal Sensing System for Automatic, Quantitative Assessment of Motion Training in Lower-Limb Rehabilitation," IEEE Trans. Syst. Man, Cybern. Syst., vol. 48, no. 5, pp. 661-669, 2018, doi: 10.1109/TSMC.2016.2636660.

[8] M. Ye, C. Yang, V. Stankovic, L. Stankovic, and S. Cheng, "GAIT PHASE CLASSIFICATION FOR IN-HOME GAIT ASSESSMENT Department of Electronic and Electrical Engineering, University of Strathclyde, Glasgow, UK Department of Computer Science and Technology, Tongji University, Shanghai, China," vol. 1, no. July, pp. 1524-1529, 2017.

[9] J. Von Zitzewitz, M. Bernhardt, and R. Riener, "Treadmill Speed Adaptation," Rehabilitation, vol. 15, no. 3, pp. 401-409, 2007.

[10] J. Kim, H. S. Park, and D. L. Damiano, "An interactive treadmill under a novel control scheme for simulating overground walking by reducing anomalous force," IEEE/ASME Trans. Mechatronics, vol. 20, no. 3, pp. 1491-1496, 2015, doi: 10.1109/TMECH.2014.2341039.

[11] A. Manurung, J. Yoon, and H. S. Park, "Speed adaptation control of a small-sized treadmill with state feedback controller," 2010 3rd IEEE RAS EMBS Int. Conf. Biomed. Robot. Biomechatronics, BioRob 2010, pp. 15-20, 2010, doi: 10.1109/BIOROB.2010.5626105.

[12] E. E. Helm and D. S. Reisman, "The Split-Belt Walking Paradigm," Phys. Med. Rehabil. Clin. N. Am., vol. 26, no. 4, pp. 703-713, 2015, doi: 10.1016/j.pmr.2015.06.010.

[13] Z. Zhang et al., "Gait recognition via disentangled representation learning," arXiv, 2019.

[14] Z. Cao, T. Simon, S. E. Wei, and Y. Sheikh, "OpenPose: Realtime Multi-Person 2D Pose Estimation using Part Affinity Fields," Proc.—30th IEEE Conf. Comput. Vis. Pattern Recognition, CVPR 2017, vol. 2017-January, no. Xxx, pp. 1302-1310, 2017, doi: 10.1109/CVPR.2017.143.

[15] T. F. Gonzalez, "ImageNet Classification with Deep Convolutional Neural Networks," Handbook of Approximation Algorithms and Metaheuristics. pp. 1-1432, 2007, doi: 10.1201/9781420010749.

[16] S. Wu, S. Zhong, and Y. Liu, "Deep residual learning for image steganalysis," Multimedia Tools and Applications. pp. 1-17, 2017, doi: 10.1007/s11042-017-4440-4.

[17] A. G. Howard and W. Wang, "Applications," 2012.

[18] X. Chen, J. Weng, W. Lu, and J. Xu, "Multi-Gait Recognition Based on Attribute Discovery," IEEE Trans. Pattern Anal. Mach. Intell., vol. 40, no. 7, pp. 1697-1710, 2018, doi: 10.1109/TPAMI.2017.2726061.

[19] A. Graves and N. Jaitly, "Towards end-to-end speech recognition with recurrent neural networks," 31st International Conference on Machine Learning, ICML 2014, vol. 5. pp. 3771-3779, 2014.

[20] I. Sutskever, 0. Vinyals, and Q. V. Le, "Sequence to sequence learning with neural networks," Adv. Neural Inf. Process. Syst., vol. 4, no. January, pp. 3104-3112, 2014.

[21] X. Shi, Z. Chen, H. Wang, D. Y. Yeung, W. K. Wong, and W. C. Woo, "Convolutional LSTM network: A machine learning approach for precipitation nowcasting," Adv. Neural Inf. Process. Syst., vol. 2015-January, pp. 802-810, 2015.

[22] Z. Wu, X. Wang, Y. G. Jiang, H. Ye, and X. Xue, "Modeling spatial-Temporal clues in a hybrid deep learning framework for video classification," MM 2015-Proc. 2015 ACM Multimed. Conf., pp. 461-470, 2015, doi: 10.1145/2733373.2806222.

[23] D. Dwibedi, Y. Aytar, J. Tompson, P. Sermanet, and A. Zisserman, "Temporal cycle-consistency learning," Proc. IEEE Comput. Soc. Conf. Comput. Vis. Pattern Recognit., vol. 2019-June, pp. 1801-1810, 2019, doi: 10.1109/CVPR.2019.00190.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method of classifying gait patterns from images, comprising:

capturing, by an image capture mechanism, one or more images of a gait-cycle of a person; and receiving, by a computing device, the captured one or more images, said computing device comprising at least a processor in communication with a memory, wherein computer-executable instructions are stored on the memory that cause the processor to:

classify one or more gait patterns using deep learning on the captured one or more images in real time using skeleton-based gait recognition, wherein the skeleton-based gait recognition comprises estimating joint locations and limbs of a human body from the captured one or more images of the gait-cycle of the person using a pre-trained pose estimation framework, said pre-trained pose estimation framework comprising:

feeding the captured one or more images into a trained convolutional neural network (CNN) to perform predictions of the joint locations;

using confidence vectors to identify the joint locations;

associating identified joint locations according to a confidence map; and bipartite matching to connect the identified joint locations;

wherein multiple consecutive images are used to construct a discriminative feature for classification of the one or more gait patterns; and wherein the multiple consecutive images comprise a first image and a second image, each of the first image and the second image comprising of six joints of a lower body of the person are collected in each of the two consecutive images and a previous frame is subtracted from a latter frame to construct a temporal feature, wherein the temporal feature provides the discriminative feature for classification of the one or more gait patterns.

2. The method of claim 1, wherein the gait patterns are classified based on joint locations in each of the captured one or more images.

3. The method of claim 1, wherein the identified joint locations comprise knee, hip and ankle joints.

4. The method of claim 2, wherein the gait patterns are classified based on the identified joint locations in each of the captured one or more images using one or more of a regression model, a random forest model, and/or a support vector machine.

* * * * *